(12) United States Patent
Jodoin

(10) Patent No.: US 7,857,445 B2
(45) Date of Patent: Dec. 28, 2010

(54) EYEWEAR HOLDER

(76) Inventor: Daniel Jodoin, 9300, rue des Rubaniers #5, Brossard (CA) J4X 2Y3

( * ) Notice: Subject to any disclaimer, the term of this patent is extended or adjusted under 35 U.S.C. 154(b) by 0 days.

(21) Appl. No.: 12/588,561

(22) Filed: Oct. 20, 2009

(65) Prior Publication Data

US 2010/0097566 A1    Apr. 22, 2010

(30) Foreign Application Priority Data

Oct. 21, 2008   (GB) ................. 0819222.1

(51) Int. Cl.
*G02C 1/00* (2006.01)

(52) U.S. Cl. .......................... 351/158; 24/3.3

(58) Field of Classification Search .............. 351/41, 351/158, 155, 47, 57; 24/3.3, 3.4, 3.5, 3.8, 24/3.9, 3.11, 3.12; 248/309.1, 309.4; 206/5

See application file for complete search history.

(56) References Cited

U.S. PATENT DOCUMENTS

| | | | |
|---|---|---|---|
| 3,883,236 A | 5/1975 | Zipper | |
| 4,938,581 A | 7/1990 | Trickel | |
| 5,235,727 A | 8/1993 | McCloskey | |
| 5,692,234 A | 12/1997 | Yuen | |
| 5,956,812 A | 9/1999 | Moennig | |
| 6,029,319 A | 2/2000 | Challender | |
| 6,045,221 A | 4/2000 | Resendez, Sr. | |
| 6,070,303 A | 6/2000 | Macy et al. | |
| 6,330,962 B1 | 12/2001 | Rodriguez | |
| 6,539,587 B2 | 4/2003 | Harrison | |
| 6,598,268 B1 * | 7/2003 | Zelman | ................. 24/3.3 |
| 6,691,374 B2 | 2/2004 | Coyne | |
| 6,709,100 B2 | 3/2004 | Kalbach | |
| 6,899,423 B1 * | 5/2005 | Brazell | ................. 351/157 |
| 7,134,751 B1 | 11/2006 | Copia | |
| 7,296,889 B2 * | 11/2007 | Dietz | ................. 351/158 |
| 2002/0021405 A1 | 2/2002 | Fukai | |
| 2007/0058129 A1 | 3/2007 | Raymond | |
| 2007/0064196 A1 | 3/2007 | Avery | |

* cited by examiner

*Primary Examiner*—Hung X Dang

(57) ABSTRACT

An eyewear holder for holding magnetically attachable eyewear, said eyewear holder comprising: a substantially rigid holder body; and two magnetic elements mounted to the holder body in a spaced apart relationship relative to each other. The eyewear is removably magnetically attachable to the two magnetic elements.

19 Claims, 4 Drawing Sheets

EYEWEAR HOLDER

This application claims priority from GB Patent Application Number 0819222.1 on Oct. 21, 2008.

FIELD OF THE INVENTION

The present invention relates generally to holders for eyewear.

BACKGROUND

Holders for eyewear are known in the art and are useful for temporary safekeeping of eyewear such as eyeglasses and sunglasses, as well as of auxiliary eyewear such as clip-on lenses that can be hooked to, or magnetically attached to a compatible pair of eyeglasses. More particularly, noticeable examples of the prior art that concern holders compatible with magnetically attachable clip-on lenses, are the following: U.S. Pat. application Ser. No. 2007/0064196 A1, to Avery (published in March 2007), U.S. Pat. application Ser. No. 2007/0058129 A1, to Raymond (published in March 2007), U.S. Pat. No. 6,899,423 B1, to Brazell (issued in May 2005), and U.S. Pat. No. 6,070,303, to Macy et Al. (issued in June 2000).

While these prior art devices generally offer a holder means for temporary safekeeping of clip-on lens, they also only offer a holder having an attachment means for suspending the latter about the neck of the user or to a portion of the user's clothing, but not both. It is sometimes desirable for practical, as well as aesthetical reasons to have both options. Also, the clip-on lens is typically Against this background, there exists a need for a new and improved eyewear holder. It is a general object of the present invention to provide a new and improved eyewear holder.

SUMMARY OF THE INVENTION

In a broad aspect, the invention provides an eyewear holder for holding magnetically attachable eyewear, said eyewear holder comprising: a substantially rigid holder body; and two magnetic elements mounted to the holder body in a spaced apart relationship relative to each other. The eyewear is removably magnetically attachable to the two magnetic elements.

For example, the eyewear is a pair of eyeglasses or auxiliary sunglasses of the clip-on type, among other possibilities.

The magnetic element is an element that magnetically interacts with the magnetically attachable eyewear to attach the eyewear to the eyewear holder. For example, the magnetic element is a magnet and the magnetically attachable element includes magnets or metallic elements that are substantially in register with the magnetic element when the eyewear is attached to the eyewear holder. In other examples, the magnetic elements are ferromagnetic metal elements and the eyewear includes suitably located magnets.

In some embodiments of the invention, the eyewear holder is generally represented by a single piece, elongated element having a length that is substantially equivalent to the width of a standard sized eyewear, and may be made of, for examples, plastic resin or a rust-proof metal.

Advantageously, in some embodiments of the invention, the eyewear holder is a versatile eyewear holder which can be conveniently suspended around the neck of a user, just as well as be securely hooked to any suitable edge of fabric of the clothing of an intender user, for handy retrieval and safekeeping of eyewear. In some embodiments, the eyewear holder is attachable to a flexible elongated element, such as a cord, so as to be easily worn around the neck of the intended user. The eyewear holder of the present invention is also simple and economical to produce.

In some embodiments of the invention, the two magnetic elements are mounted to the holder body so as to be movable relatively thereto each along a respective predetermined path. In these embodiments, the eyewear holder is usable to hold eyewear having various dimensions and configurations.

In another broad aspect, the invention provides an eyewear holder for holding magnetically attachable eyewear, the eyewear holder being usable with a substantially elongated substantially flexible element defining two substantially opposed flexible element end sections, the eyewear holder comprising: a substantially elongated substantially rigid holder body, the holder body defining a substantially longitudinally extending hook for suspending the eyewear holder and a pair of substantially longitudinally opposed body grooves each for receiving a respective one of the flexible element end sections; and two magnetic elements mounted to the holder body in a substantially longitudinally spaced apart relationship relative to each other. The eyewear is removably magnetically attachable to said two magnetic elements.

Other objects, advantages and features of the present invention will become more apparent upon reading of the following non-restrictive description of preferred embodiments thereof, given by way of example only with reference to the accompanying drawings.

DETAILED DESCRIPTION

Figure 1:
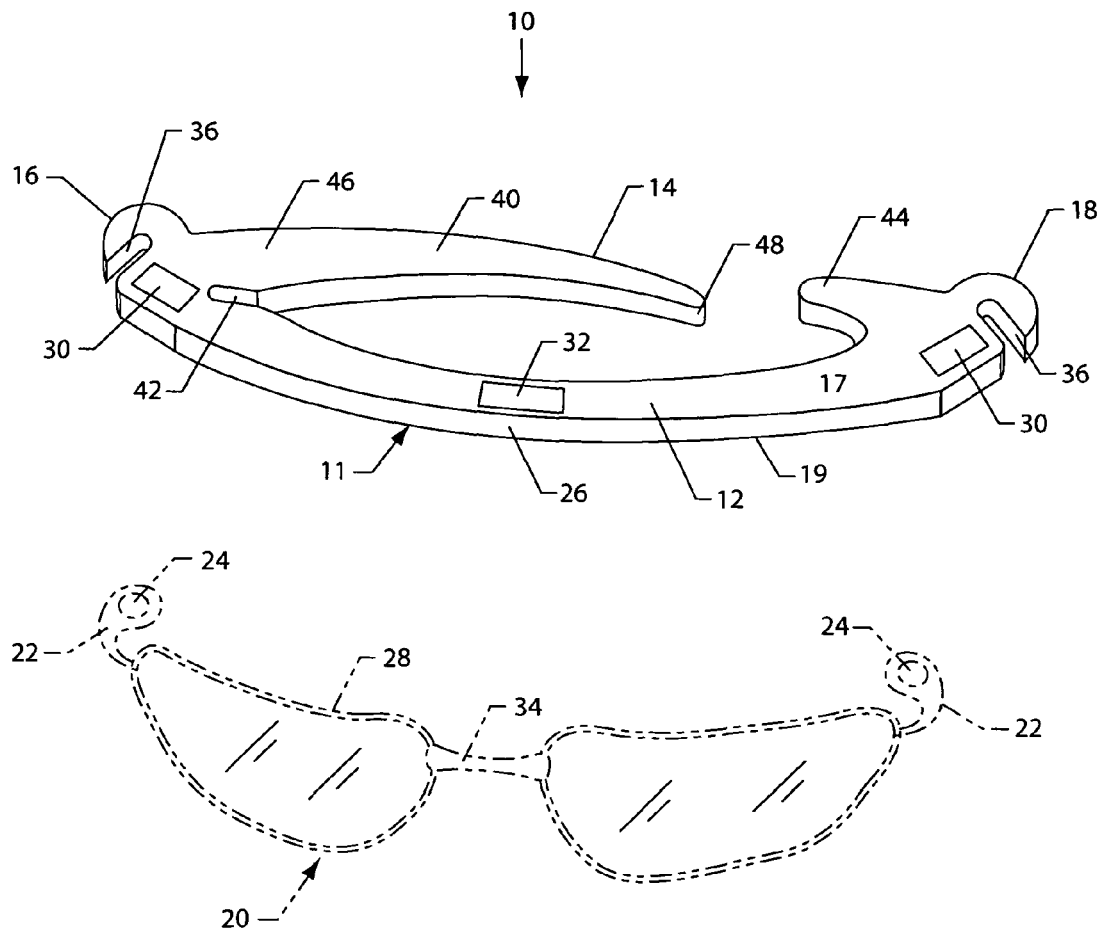
FIG. 1, in a perspective view, illustrates an eyewear holder according to an embodiment of the present invention and a magnetically attachable eyewear attachable to the magnetic holder, the magnetically attachable eyewear being shown in phantom lines.

FIG. 1 shows various aspects of a first embodiment of an eyewear holder 10 according to the present invention. In some embodiments of the invention, the eyewear holder 10 is generally represented by a single piece element that may be made of a sufficiently rigid material such as, for examples, plastic resin, using a conventional injection molding process, or a light and rust-proof metal, such as aluminum, using a punch-press process.

The eyewear holder 10 includes a substantially rigid holder body 11 generally defined as having a proximal portion 12 and a distal portion 14. The eyewear holder 10 is substantially elongated and defines substantially opposed side ends 16, 18.

The proximal portion 12 is typically a substantially elongated member of sufficient length that is substantially equivalent to the overall average width of a standard sized eyewear 20, such as a clip-on lens illustrated in the drawings, the eyewear 20 defining end portions 22 generally equipped with magnetic elements 24. Typically, the holder body 11 is relatively flat and relatively thin and defines two substantially planar and substantially opposed body surfaces 17 and 19.

The proximal portion 12 is further characterized by a lightly curved proximal surface 26 that is in register with the average inner curved configuration 28 of the eyewear 20.

Two magnetic elements 30 are mounted to the holder body 11 in a spaced apart relationship relative to each other. For example, the two magnetic elements 30 are connected to, or embedded in the proximal portion 12 substantially adjacent the side ends 16 and 18 thereof. Typically, the holder body 11 is substantially elongated and the magnetic elements 30 are fixedly mounted to the holder body 11 in a predetermined spaced apart relationship relative to each other, for example in a substantially longitudinally spaced apart relationship relative to each other.

The magnetic elements 30 are of sufficient size and suitably positioned such that they can be placed in close proximity with the corresponding magnetic elements 24 provided near each end portions 22 of the eyewear 20. Therefore, the eyewear 20 is removably magnetically attachable to the two magnetic elements 30.

In some embodiments of the invention, a third magnetic element 32 is substantially centrally positioned along the length of the proximal portion 12 for magnetically retaining a corresponding magnetic element (not shown), or simply a magnetizable metal element, that can be found connected to, or embedded in the bridge element 34 on certain models of auxiliary eyewear of the clip-on type. The magnetic elements 30 and 32 are mounted to the holder body 11 in a substantially spaced apart relationship relative to each other.

All three magnetic elements 30 and 32 typically extend through the holder body 11 between the body surfaces 17 and 19 such that the eyewear holder 10 may be magnetically attracted to the corresponding magnetic elements 24 of the eyewear 20 from either side surface of the eyewear holder 10. Furthermore, all three magnetic elements 30 and 32 are typically elongated magnets that may be substantially rectangular (as shown), or having any other suitably elongated shape, that are substantially longitudinally aligned in a substantially parallel fashion proximally along the proximal surface 26 of the proximal portion 12.

Figure 2:
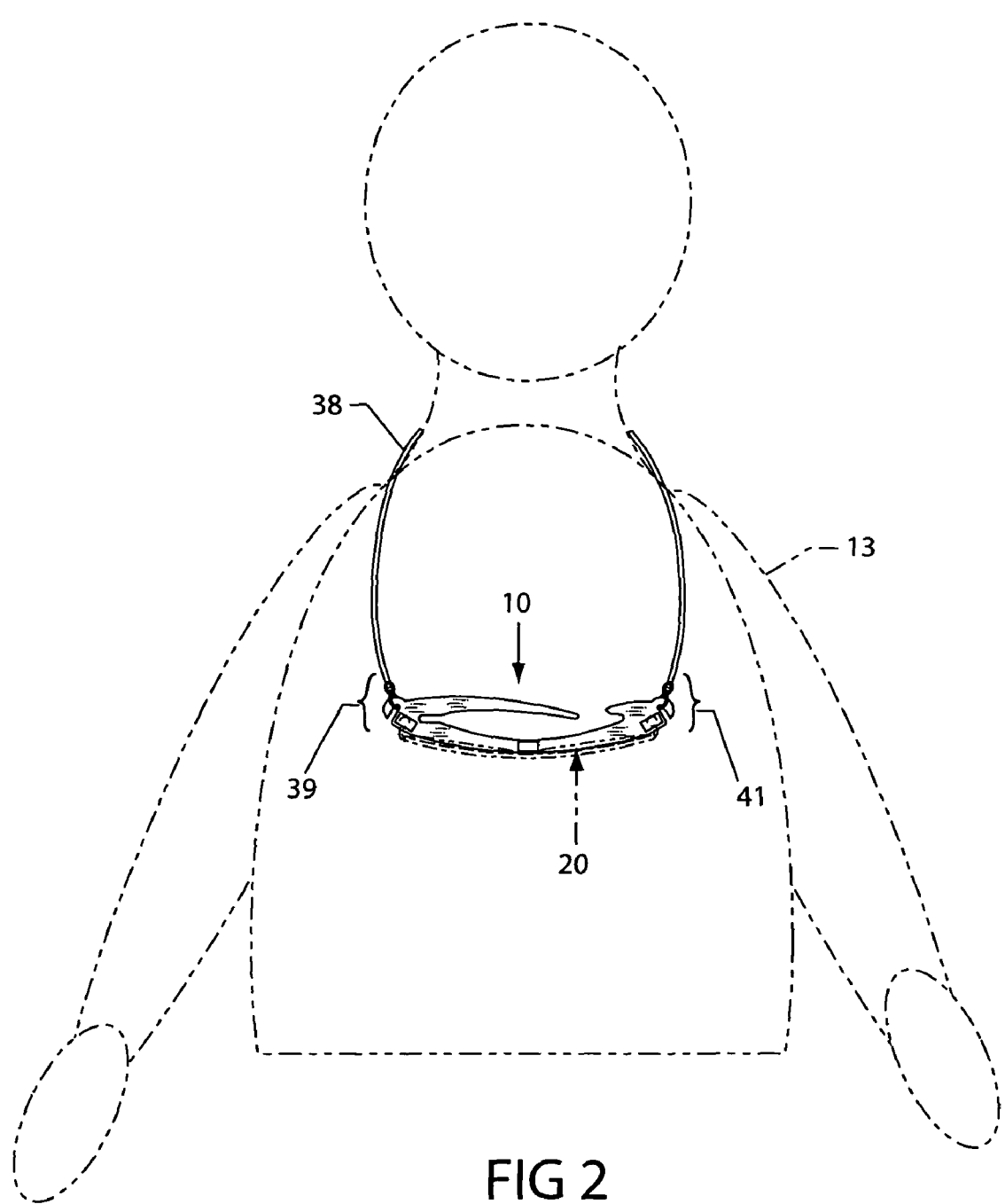
FIG. 2, in an environmental view, illustrates the eyewear holder shown in FIG. 1 suspended about the neck of an intended user.

The side ends 16 and 18 are each provided with a relatively narrow slotted groove 36 for slidably receiving and retaining therein substantially opposed flexible element end sections 39 and 41 of an optional substantially elongated substantially flexible element 38 (as shown in FIG. 2), such as a cord of suitable length that is equipped with retaining end knots, hooks, or the like. The flexible retaining element 38 may be used to conveniently suspend the eyewear holder 10 about the neck of an intended user 13.

Figure 3:
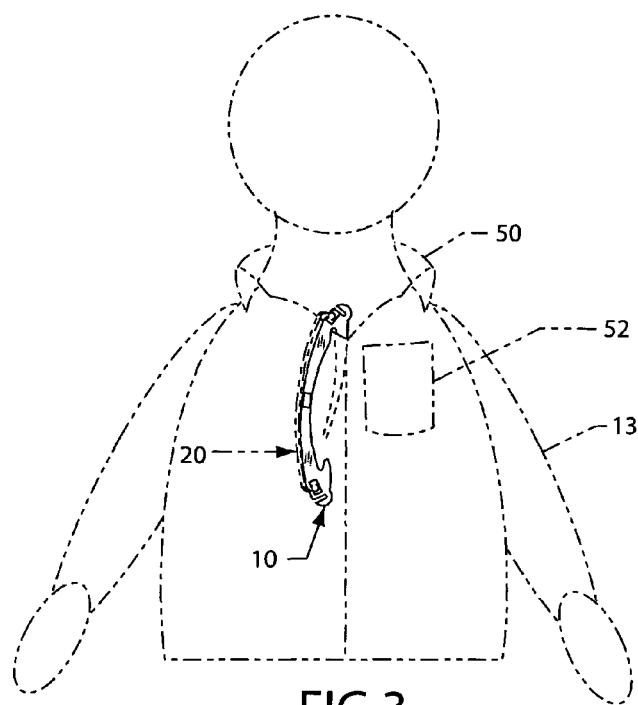
FIG. 3, in an environmental view, illustrates the eyewear holder shown in FIGS. 1 and 2 shown suspended sidewardly to the edge of a shirt collar.
Figure 4:
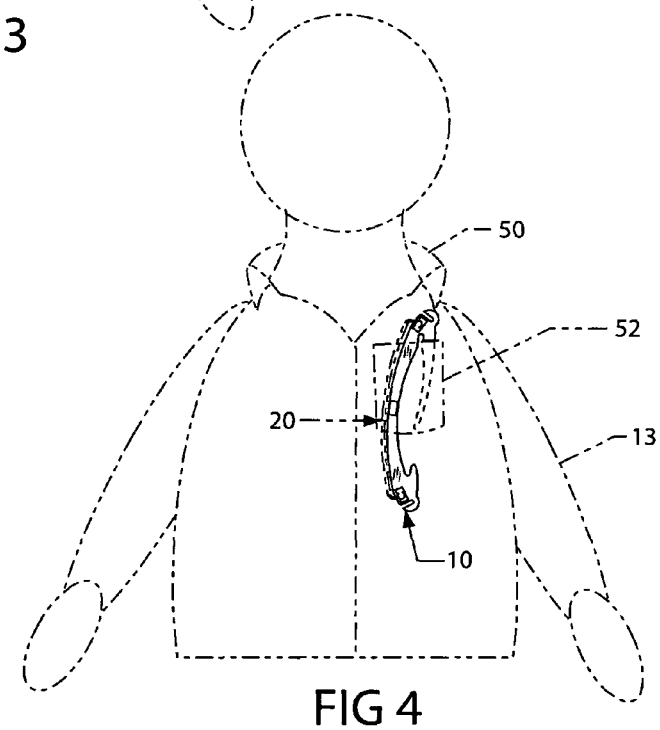
FIG. 4, in an environmental view, illustrates the eyewear holder shown in FIGS. 1 to 3 shown suspended sidewardly to the edge of a shirt pocket.

Substantially adjacent the side end 16, there is a substantially elongated hooking stem that is divergently extending laterally inwardly and distally therefrom to form a hook 40 for suspending the eyewear holder 10. The hook 40 defines a hook proximal end 46 and a substantially opposed hook distal end 48, the hook distal end 48 being a free end. The hook 40 extends from the proximal portion 12 of the holder body 11 substantially adjacent the hook proximal end 46 and defines a slit 42 extending into the holder body 11 substantially adjacent the hook proximal end 46. The slit 42, in cooperation with the hook 40, may be used as a hooking means to securely suspend the eyewear holder 10 sidewardly, for example, to any suitable edge of fabric of the clothing of the intended user 13. For examples, the eyewear holder 10 may thus be conveniently suspended along the edge of the collar of a shirt 50, as illustrated in FIG. 3, or along the edge of a shirt pocket 52, as illustrated in FIG. 4.

Returning to FIG. 1, an oppositely oriented and relatively shorter hooking stem 44 is extending from the proximal portion 12 substantially adjacent the other side end 18 toward the hook 40 and may be used as a hook to conveniently suspend the eyewear holder 10 to, for example, the support stem of the rearview mirror of a car (not shown in the drawings).

Figure 5:
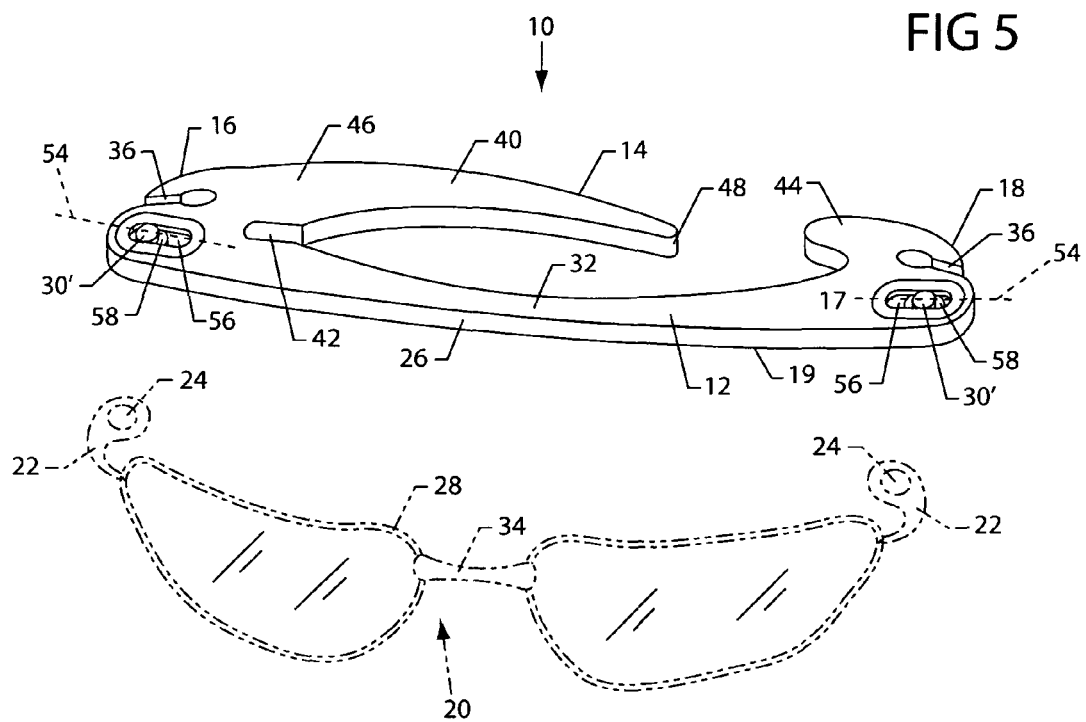
FIG. 5, in a perspective view, illustrates an eyewear holder according to an alternative embodiment of the present invention.

Referring to FIG. 5, there is shown an eyewear holder 10' in accordance with an alternative embodiment of the invention. The eyewear holder 10' is substantially similar to the eyewear holder 10 and only differences between front end the two eyewear holders 10 and 10' are described herein.

In the eyewear holder 10', the two magnetic elements 30' are mounted to the holder body 11 so as to be movable relatively thereto each along a respective predetermined path 54. Typically, but non-exclusively, the predetermined paths 54 are each substantially rectilinear.

Figure 6:
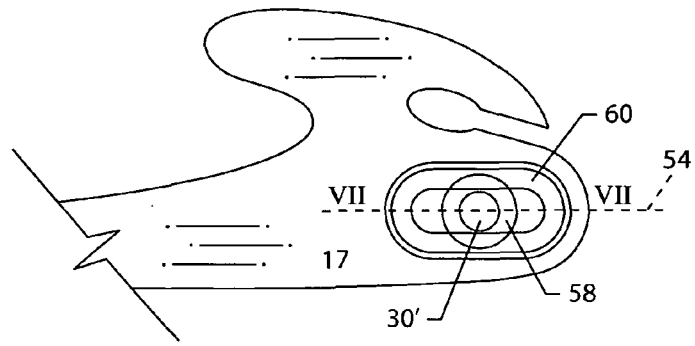
FIG. 6, in a partial plan view, illustrates the eyewear holder shown in FIG. 5.
Figure 7:
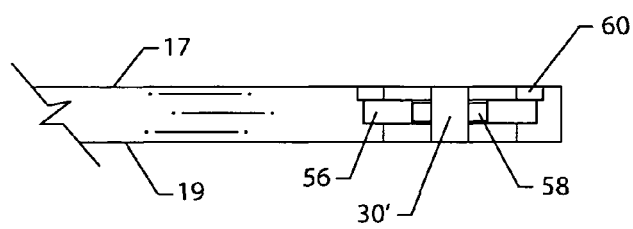
FIG. 7, in a side cross-sectional view along the line VII-VII of FIG. 6, illustrates the eyewear holder shown in FIG. 6.

For example, as seen in FIGS. 6 and 7, the holder body 11 defines a pair of bores 60 extending therethrough between the body surfaces 17 and 19 and along the predetermined paths 54. Typically, the bores 60 are substantially oval-shaped, but other configurations are within the scope of the invention. The bores 60 each define a substantially circumferential groove 56 extending substantially radially outwardly therefrom into the holder body 11 at a location intermediate the body surfaces 17 and 19.

The two magnetic elements 30' are each mounted to a respective carriage 58. Each carriage 58 is mounted in a respective one of the bores 60 so as to be movable therealong. More specifically, each carriage 58 is mounted in a respective one of the circumferential grooves 56. In some embodiments of the invention, the carriages 58 are substantially disc-shaped and the magnetic elements 30' are mounted to the carriages 58 so that they protrude in the bores 60. Typically, the magnetic elements 30 are substantially flush with the body surfaces 17 and 19.

Although the present invention has been described hereinabove by way of preferred embodiments thereof, it can be modified, without departing from the spirit and nature of the subject invention as defined in the appended claims.

What is claimed is:

1. An eyewear holder for holding magnetically attachable eyewear, said eyewear holder comprising:
   a substantially rigid holder body; and
   two magnetic elements mounted to said holder body in a spaced apart relationship relative to each other;
   wherein said eyewear is removably magnetically attachable to said two magnetic elements, and said two magnetic elements are mounted to said holder body so as to be movable relatively thereto each along a respective predetermined path.

2. An eyewear holder as defined in claim 1, wherein said predetermined paths are each substantially rectilinear.

3. An eyewear holder as defined in claim 1, wherein
   said holder body defines two substantially planar and substantially opposed body surfaces;
   said holder body defines a pair of bores extending therethrough between said body surfaces and along said predetermined paths; and
   said two magnetic elements are each mounted to a respective carriage;

each of said carriages being mounted in a respective one of said bores so as to be movable therealong.

4. An eyewear holder as defined in claim 3, wherein
said bores each define a substantially circumferential groove extending substantially radially outwardly therefrom into said holder body at a location intermediate said body surfaces;
each of said carriages is mounted in a respective one of said circumferential grooves.

5. An eyewear holder as defined in claim 1, wherein said magnetic elements are magnets.

6. An eyewear holder as defined in claim 1, wherein said holder body defines a hook for suspending said eyewear holder.

7. An eyewear holder for holding magnetically attachable eyewear, said eyewear holder comprising:
a substantially rigid holder body; and
two magnetic elements mounted to said holder body in a spaced apart relationship relative to each other;
wherein said eyewear is removably magnetically attachable to said two magnetic elements, and said holder body defines a hook for suspending said eyewear holder, said hook defining hook proximal end and a substantially opposed hook distal end, said hook distal end being a free end, said holder body defining a slit extending thereinto substantially adjacent said hook proximal end.

8. An eyewear holder as defined in claim 7, wherein said magnetic elements are substantially elongated.

9. An eyewear holder as defined in claim 7, wherein said holder body defines two substantially planar and substantially opposed body surfaces, said two magnetic elements extending through said holder body between said body surfaces.

10. An eyewear holder as defined in claim 7, comprising three magnetic elements mounted to said holder body in a substantially spaced apart relationship relative to each other.

11. An eyewear holder as defined in claim 7, wherein said holder body is substantially elongated and said two magnetic elements are substantially longitudinally spaced apart from each other.

12. An eyewear holder as defined in claim 7, wherein said two magnetic elements are fixedly mounted to said holder body in a predetermined spaced apart relationship relative to each other.

13. An eyewear holder as defined in claim 7, wherein at least one of said two magnetic elements is a ferromagnetic metal element.

14. An eyewear holder for holding magnetically attachable eyewear, said eyewear holder comprising:
a substantially rigid holder body; and
two magnetic elements mounted to said holder body in a spaced apart relationship relative to each other;
wherein said eyewear is removably magnetically attachable to said two magnetic elements, said eyewear holder being usable with a substantially elongated substantially flexible element defining two substantially opposed flexible element end sections, said holder body defining a pair of substantially opposed grooves each for receiving a respective one of said flexible element end sections.

15. An eyewear holder for holding magnetically attachable eyewear, said eyewear holder being usable with a substantially elongated substantially flexible element defining two substantially opposed flexible element end sections, said eyewear holder comprising:
a substantially elongated substantially rigid holder body, said holder body defining a substantially longitudinally extending hook for suspending said eyewear holder and a pair of substantially longitudinally opposed body grooves each for receiving a respective one of said flexible element end sections; and
two magnetic elements mounted to said holder body in a substantially longitudinally spaced apart relationship relative to each other;
wherein said eyewear is removably magnetically attachable to said two magnetic elements.

16. An eyewear holder as defined in claim 15, wherein said holder body defines two substantially planar and substantially opposed body surfaces, said two magnetic elements extending through said holder body between said body surfaces.

17. An eyewear holder as defined in claim 15, comprising three magnetic elements mounted to said holder body in a substantially spaced apart relationship relative to each other.

18. An eyewear holder as defined in claim 15, wherein said two magnetic elements are fixedly mounted to said holder body in a predetermined spaced apart relationship relative to each other.

19. An eyewear holder as defined in claim 15, wherein at least one of said two magnetic elements is a ferromagnetic metal element.

* * * * *